United States Patent Office 3,476,794
Patented Nov. 4, 1969

3,476,794
13,17-SECO-17-NITRILE-$\Delta^{13(18)}$ STEROIDS OF THE ANDROSTANE AND ESTRANE SERIES AND THE PROCESS FOR THE PREPARATION THEREOF
John G. Moffatt, Los Altos, and Allan H. Fenselau, Berkeley, Calif., assignors to Syntex Corporation, Panama, Panama, a corporation of Panama
No Drawing. Filed Oct. 5, 1966, Ser. No. 584,342
Int. Cl. C07c *121/66*
U.S. Cl. 260—465         11 Claims

ABSTRACT OF THE DISCLOSURE 13,17-seco-17-nitrile-$\Delta^{13(18)}$ steroids of the androstane or estrane series are useful as anti-estrogenic agents and possess anti-gonadotrophic and cholesterol lowering activity. The 13,17-seco-17-nitrile-$\Delta^{13(18)}$ steroids are prepared by reacting, under acidic and substantially anhydrous conditions in a solvent comprising a di(lower)-alkyl sulfoxide or alkylene sulfoxide, a 17-oximido steroid of the androstane or estrane series and a N,N'-di-(hydrocarbon substituted) carbodiimide.

---

This invention relates to a novel process for the preparation of cyclopentanophenanthrene derivatives.

More particularly, the present invention relates to a novel proces for the preparation of unsaturated steroidal nitriles and to certain novel steroidal nitriles.

In accordance with the present invention 13,17-seco-17-nitrile-$\Delta^{13(18)}$ steroids of the androstane or estrane series are prepared by a novel process which comprises reacting, under substantially anhydrous conditions in a solvent comprising a di(lower)alkyl sulfoxide or alkylene sulfoxide and in the presence of an acid catalyst, a 17-oximido steroid of the androstane or estrane series and a N,N'-di(hydrocarbon substituted) carbodiimide.

The expression "17-oxmido steroid" as used herein and in the appended claims is understood to refer to cyclopentanophenanthrene derivatives having a hydroxyimino group at the carbon-17 position. The steriod nucleus can be saturated, unsaturated, or aromatic. The 17-oximido steroid starting materials can be prepared, for example, by refluxing a 17-keto steroid with an excess of hydroxylamine acetate according to the procedure described by St. Kaufmann, J. Am. Chem. Soc., 73, 1780 (1951) or Nagata, U.S. Patent 3,055,917.

The carbodiimide, an N,N'-di(hydrocarbon substituted) carbodiimide, employed in the process of the present invention is preferably an N,N'-dialkyl (including cycloalkyl) carbodiimide, such as N,N'-dimethylcarbodiimide, N,N'-di-n-propylcarbodiimide, N,N' - diisopropylcarbodiimide, N,N'-dibutylcarbodiimide, N,N'-dicyclohexylcarbodiimide, N,N'-di(methylcyclohexyl) carbodiimide, and the like. However, N,N'-diarylcarbodiimides, such as N,N'-di-p-tolylcarbodiimide and the like, and N-alkyl-N'-arylcarbodiimides, such as N-(4-pyridylmethyl)-N'-cyclohexylcarbodiimide (which can be prepared by the condensation of cyclohexylisothiocyanate and 4-aminomethylpyridine followed by desulfurization with sodium hypochlorite or mercuric oxide), and the like, can also be used, if desired, although somewhat longer reaction times and lower yields result when carbodiimides other than the N,N'-dialkylcarbodiimides are used. In fact, the fastest reaction times and highest yields, all other factors being held constant, have been observed when using N,N'-dicyclohexylcarbodiimide. The amount of carbodiimide employed can range from about 1 to about 10 molar equivalents, and preferably from about 3 to about 8 molar equivalents, per molar equivalent of 17-oximido steroid.

A di(lower)-alkyl sulfoxide, e.g. dimethylsulfoxide, diethylsulfoxide, and the like or an alkylene sulfoxide, e.g. tetramethylenesulfoxide, and the like, which is a liquid at the temperature at which the reaction is carried out, can be employed as the sole solvent for the reaction or it can be admixed with one or more mutually compatible inert organic solvents, such as benzene, toluene, xylene, dioxane, ethyl acetate, and the like. In this latter case the amount of hydrocarbon sulfoxide present in the solvent mixture will be at least about 10% and preferably at least about 50% by volume, of the entire solvent mixture. The preferred solvent, whether used alone or in admixture with another solvent or solvents, is dimethylsulfoxide.

The total amount of solvent employed is primarily dependent on the solubility of the 17-oximido steroid. In general, however, solutions containing from about 1% to about 30% by weight of the 17-oximido steroid have been found to be especially suitable.

The acid catalyst employed can be any organic or inorganic acid, or a salt thereof, which will provide an acidic reaction medim. Acidic substances such as the oxyacids of phosphorus, e.g., phosphoric acid, phosphorous acid, hypophosphorus acid, and the like, phosphorus acid derivatives, e.g., acid phosphates such as monophenylphosphate, diphenylphosphate, and the like, as well as other relatively strong acids and acids of intermediate strength, e.g., p-toluenesulfonic acid, trifluoroacetic acid, and the like, and amine salts, such as the pyridine salts of hydrochloric, sulfuric, perchloric, orthophosphoric and trifluoroacetic acids, and the like, have proven to be especially suitable, while mineral acids per se, e.g. hydrochloric, sulfuric and perchloric acids, and the like, have been found to be less suitable than, for example, the aforementioned oxyacids of phosphorus. The amount of acid catalyst employed is not critical except insofar as increases or decreases in yields or in the rate of reaction are concerned since it is only necessary that the amount used be sufficient to render the reaction medium acidic, and thus, can be varied to a considerable extent, depending on such factors as those mentioned hereinabove as well as on the particular acidic substance or substances used, the carbodiimide employed, and the like. However, a preferred range of amounts, especially where an acid or amine salt of intermediate strength is employed, e.g., phosphoric acid, pyridinium hydrochloride, and the like, will be from about 0.01 molar equivalent to about 5 molar equivalents, and more particularly from about 0.5 to about 1 molar equivalents, per molar equivalent of the steroidal 17-oxime.

The reaction is carried out under subsetantially anhydrous conditions, i.e., at as low a moisture content as can be practicably achieved. Thus, the reactants, solvent and catalyst will be rendered substantially anhydrous, i.e. substantially all water which is not chemically bound will be removed therefrom, before they are admixed.

The process of the present invention can be carried out at a temperature of from about 10° C. to about 100° C., and preferably at from about 20° C. to about 30° C. or about room temperature, for periods of time ranging from about 30 minutes to about 48 hours, depending for the most part on the nature of the steroidal 17-oxime and the acid catalyst. Here too, however, higher or lower reaction temperatures coupled with shorter or longer reaction times can be employed, if desired.

17-oximido steroids to which the novel process of the present invention is applicable are the steroids, saturated and unsaturated, of the androstane and estrane series having a hydroxyimino group at C–17. They can be represented by the following partial formula:

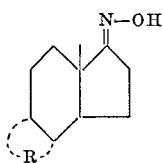

wherein R represents rings A and B of the steroid molecule. The steroid molecule can be substituted at various positions with groups or substituents other than the hydroxyimino group such as hydroxy, hydrocarbon carboxylic acyloxy of less than 12 carbon atoms such as acetoxy, valeroxy, trimethylacetoxy, and the like, lower alkyl of up to about 6 carbon atoms such as methyl, ethyl, and the like, lower alkenyl and alkinyl of up to about 6 carbon atoms such as vinyl, propenyl, ethinyl, and the like, cycloalkyl of about 3 to 7 carbon atoms such as cyclopentyl, cyclopropyl, and the like, fluoro, chloro, bromo, oxo, lower alkoxy and cycloalkoxy such as methoxy, ethoxy, cyclopentyloxy, and the like, lower alkylenedioxy such as ethylenedioxy and the like, hydroxymethyl, tetrahydropyran-2-yloxy, tetrahydrofuran-2-yloxy, cyano, formyl, and the like. The process of the present invention will oxidize a free hydroxyl to the corresponding oxo group. If formation of an oxo group is not desired, any hydroxy groups present can be protected from the oxidizing action of the process by methods known in the art such as by etherification by treatment with dihydrofuran or dihydropyran in the presence of an acid catalyst, e.g. p-toluenesulfonic acid or the chloride thereof, or by esterification by treatment with, e.g. a carboxylic acid anhydride such as acetic anhydride and pyridine. A representative but by no means exclusive list of the 17-oximido steroids of the androstane and estrane series which can be employed in the process of the present invention include the 17-oxime of 3β-acetoxyandrost-5-en-17-one,
3β-hydroxyandrost-5-en-17-one,
3β-hydroxy-5α-androstan-17-one,
3α-hydroxy-5β-androstan-17-one,
3,3-cycloalkylenedioxyandrost-5-ene-11,17-dione,
3-ethoxyandrosta-3,5-diene-11,17-dione,
3,11α-dihydroxyandrosta-3,5-dien-17-one 3-ethyl ether,
androst-4-ene-3,11,17-trione,
androst-4-ene-3,17-dione,
3-methoxyestra-1,3,5(10)-trien-17-one,
3-benzoyloxyestra-1,3,5(10)-triene-17-one,
3-ethoxy-B-norandrosta-3,5-dien-17-one,
B-norandrost-4-ene-3,17-dione,
5α-androst-1-ene-3,17-dione,
6β-(β-diethylaminoethoxy)-3,5-cycloandrostan-17-one,
androsta-1,4-diene-3,17-dione,
androsta-4,6-diene-3,17-dione,
androsta-1,4,6-triene-3,17-dione,
androst-4-ene-3,11,17-trione,
11β-hydroxyandrosta-1,4-diene-3,17-dione,
4-chloroandrost-4-ene-3,17-dione,
2α-fluoroandrostane-3,17-dione,
16-methylene-androst-4-ene-3,17-dione,
11β-hydroxy-16-methylene-androst-4-ene-3,17-dione,
1-methylthio-androstane-3,17-dione,
estr-4-ene-3,17-dione,
6α-methylandrost-4-ene-3,17-dione,
6α-fluoroandrost-4-ene-3,17-dione,
androsta-3,5-dien-17-one,
9α,11β-dichloro-androst-4-ene-3,17-dione,
6-methylandrosta-4,6-diene-3,17-dione,
2β-hydroxy-3α-fluoroandrostan-17-one,
2-fluoroestr-2-en-17-one,
9α,11β-dichloroandrosta-1,4-diene-3,17-dione, and the like.

The 13,17-seco-17-nitrile-$\Delta^{13(18)}$ steroids prepared by the process of the above invention can be represented by the following partial formula:

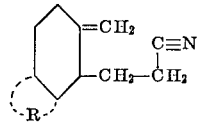

wherein R is as defined hereinabove. The 13,17-seco-17-nitrile-$\Delta^{13(18)}$ steroids of the androstane and estrane series can be substituted at various positions with groups or substituents as set forth hereinabove in connection with the description of the 17-oximido steroid starting material.

In the practice of the process of the present invention, in addition to formation of the 13,17-seco-17-nitrile-$\Delta^{13(18)}$ steroids, there is also formed steroidal lactams or 17α-aza-D-homo steroids. The steroidal lactams are easily separated from the reaction mixture by conventional techniques such as chromatography.

The novel 13,17-seco-17-nitriles-$\Delta^{13(18)}$ steroids of the present invention are useful hormonal agents and as intermediates for the preparation of other hormonal agents. They are particularly useful as anti-estrogenic agents. They can be used in the same manner as known anti-estrogenic agents. The compounds of the present invention having an aromatic A ring also possess anti-gonadotrophic and cholesterol lowering activity.

In order that those skilled in the art can more fully understand the present invention, the following examples are provided.

EXAMPLE 1

0.96 gram of the 17-oxime of 3-methoxyestra-1,3,5(10)-trien-17-one is dissolved in an anhydrous mixture of 5 ml. of dimethyl sulfoxide and 5 ml. of benzene containing 1.85 g. of dicyclohexylcarbodiimide and 0.15 ml. of trifluoroacetic acid. After standing overnight (about 16 hours) at room temperature, the reaction mixture is diluted with ethyl acetate and crystalline dicyclohexylurea is removed by filtration. The filtrate is extracted three times with water and the organic phase is separated, dried over sodium sulfate and evaporated. The resulting residue is dissolved in benzene and poured into a chromatographic column of 200 g. of silicic acid. Elution with benzene furnishes 3-methoxy-13,17-seco-estra-1,3,5(10), 13(18)-tetraene-17-nitrile which has the following structural formula:

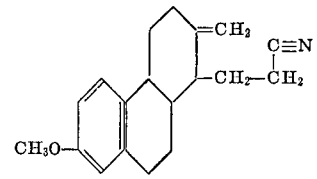

Further elution of the column with chloroform followed by elution with chloroform:ethyl acetate (3:1) furnishes 3-methoxy-17α-aza-D-homoestra-1,3,5(10)-trien-17-one.

Similarly, by repeating the procedure of the above example using the 17-oxime of 3-benzoyloxyestra-1,3,5-(10)-trien-17-one, androst-4-ene-3,17-dione, 3β-hydroxy-5α-androstan-17-one and 6α-methylandrost-4-ene-3,17-dione as the starting material, there is obtained 3-benzoyloxy - 13,17 - seco - estra - 1,3,5(10),13(18) - tetraene-17 - nitrile, 13,17-seco-androsta-4,13(18)-dien-3-oxo-17-nitrile, 13,17-seco-5α-androst-13(18)-en-3-oxo-17-nitrile, and 6α-methyl-13,17-seco-androsta-4,13(18)-dien-3-oxo-17 nitrile, respectively.

EXAMPLE 2

1.04 grams of 3β-acetoxyandrost-5-en-17-one oxime is dissolved in an anhydrous mixture of 5 ml. of dimethyl sulfoxide and 5 ml. of benzene containing 1.85 grams of dicyclohexylcarbodiimide and 0.15 ml. of trifluoroacetic acid. After standing about 15 hours at room temperature, the reaction mixture is diluted with ethyl acetate and crystalline dicyclohexylurea is removed by filtration. The filtrate is extracted three times with water and the organic phase is separated, dried over sodium sulfate and evaporated. The resulting residue is taken up in benzene and poured into a chromatographic column of 200 g. of silicic acid. Elution with benzene furnishes 3β-acetoxy-13,17 - seco - androsta-5,13(18)-diene-17-nitrile and 3β-acetoxy-13,17-seco-androsta-5,13(14) - diene - 17 - nitrile which can be separated by absorption chromatography. Continued elution of the column with chloroform-ethyl acetate (1:1) furnishes 3β-acetoxy-17α-aza-D-homo-androst-5-en-17-one.

To a cold solution of 4 g. of 3β-acetoxy-13,17-seco-androsta-5,13(18)-diene-17-nitrile in 60 ml. of methanol and 10 ml. of tetrahydrofuran are added 20 ml. of cold 2% methanolic potassium hydroxide. The solution is allowed to stand at from 0° to 5° C. for one hour, poured into water and neutralized with dilute hydrochloric acid. The neutralized solution is then extracted with ether and the solid obtained upon concentration of these ethereal extracts is chromatographed on ethyl acetate washed alumina, eluting with 1:3 hexane:benzene and benzene, to yield 13,17 - seco - androsta - 4,13(18)-dien-3-oxo-17-nitrile which is further purified through recrystallization from acetone:hexane.

What is claimed is:

1. A compound selected from the group consisting of 3-methoxy-13,17 - seco - estra-1,3,5(10),13(18)-tetraene-17-nitrile and 3-benzoyloxy-13,17-seco-estra-1,3,5(10),13-(18)-tetraene-17-nitrile.

2. A process for the preparation of 13,17-seco-17-nitrile-Δ¹³⁽¹⁸⁾ steroids of the androstane or estrane series of the partial formula

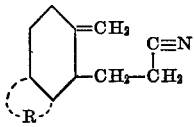

wherein R represents rings A and B of the steroid molecule, which comprises treating, under acidic and substantially anhydrous conditions, in a solvent comprised of a di(lower)alkyl sulfoxide or alkylene sulfoxide, alone or in combination with an inert organic solvent, provided that the amount of di(lower)alkyl sulfoxide or alkylene sulfoxide in a solvent mixture will be at least about 10% by volume; and in the presence of about 0.01 molar equivalent to about 5 molar equivalents of an acid catalyst, (a) one molar equivalent of a 17-oximido steroid of the androstane or estrane series of the partial formula

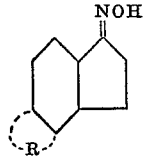

wherein R is as defined above; with (b) from about 1 to about 10 molar equivalents of a N,N'-di-(hydrocarbon substituted)carbodiimide at a temperature of from about 10° C. to about 100° C.

3. The process according to claim 2 wherein one molar equivalent of a 17-oximide steroid of the androstane or estrane series is treated, under acidic and substantially anhydrous conditions, in a solvent comprised of a di-(lower)alkyl sulfoxide, alone or in combination with an inert organic solvent, provided that the amount of di-(lower)alkyl sulfoxide in a solvent mixture will be at least 50% by volume; and, in the presence of from about 0.5 to about 1 molar equivalent of an acid catalyst, with from about 3 to about 8 molar equivalents of a N,N'-di(hydrocarbon substituted)carbodiimide at a temperature of from about 20° C. to about 30° C.

4. A method according to claim 3 wherein said 17-oximido steroid is a 17-oximido steroid of the androstane series.

5. A method according to claim 3 wherein said 17-oximido steroid is a 17-oximido steroid of the estrane series.

6. A method according to claim 3 wherein said 17-oximido steroid is the 17-oxime of 3-methoxyestra-1,3,5(10)-trien-17-one.

7. A method according to claim 3 wherein said 17-oximido steroid is the 17-oxime of 3β-acetoxyandrost-5-en-17-one.

8. A method according to claim 3 wherein the di-(lower)alkyl sulfoxide is dimethylsulfoxide.

9. A method according to claim 3 wherein said N,N'-di(hydrocarbon substituted) carbodiimide is N,N'-dicyclohexylcarbodiimide.

10. A method according to claim 3 wherein said acid catalyst is trifluoroacetic acid.

11. A method according to claim 3 wherein said di-(lower)alkyl sulfoxide is dimethyl sulfoxide and the N,N'-di(hydrocarbon substituted) carbodiimide is N,N'-dicyclohexylcarbodiimide.

References Cited

UNITED STATES PATENTS 3,313,703  4/1967  Bucourt et al. _____ 260—465

FOREIGN PATENTS 573,826  4/1959  Canada.

OTHER REFERENCES

Smith: The Chemistry of Open-Chain Organic Nitrogen Compounds, vol. 1, p. 253, 1965.

Fieser et al.: Steroids, p. VIII, 1959.

CHARLES B. PARKER, Primary Examiner

S. T. LAWRENCE III, Assistant Examiner

U.S. Cl. X.R.

260—239.55, 294.7, 340.5, 345.9, 347.7, 347.8, 397, 397.1, 397.3, 397.4, 397.45, 397.5, 456, 464, 479, 563, 566, 570.7, 586, 590, 592, 999